(12) United States Patent
Lee (10) Patent No.: US 10,178,639 B2
(45) Date of Patent: Jan. 8, 2019

(54) METHOD FOR CONTROLLING TIMING OF TERMINAL IN WIRELESS COMMUNICATION SYSTEM, AND ELECTRONIC DEVICE THEREFOR

(71) Applicant: Samsung Electronic Co., Ltd., Suwon-si, Gyeonggi-do (KR)

(72) Inventor: Ik-Beom Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/111,606

(22) PCT Filed: Jan. 16, 2015

(86) PCT No.: PCT/KR2015/000464
§ 371 (c)(1),
(2) Date: Jul. 14, 2016

(87) PCT Pub. No.: WO2015/108362
PCT Pub. Date: Jul. 23, 2015

(65) Prior Publication Data
US 2016/0337999 A1    Nov. 17, 2016

(30) Foreign Application Priority Data
Jan. 16, 2014  (KR) .................. 10-2014-0005664

(51) Int. Cl.
H04W 56/00      (2009.01)
H04W 74/08      (2009.01)
(Continued)

(52) U.S. Cl.
CPC ...... H04W 56/0045 (2013.01); H04L 27/2663 (2013.01); H04W 56/005 (2013.01); H04W 74/0833 (2013.01); H04L 5/0078 (2013.01)

(58) Field of Classification Search
CPC .......... H04W 56/0045; H04W 56/005; H04W 74/0833; H04W 72/04; H04W 4/06;
(Continued)

(56) References Cited

U.S. PATENT DOCUMENTS 6,963,842 B2 * 11/2005 Goodwin .............. G06F 17/147
341/50
2011/0243111 A1  10/2011 Andgart et al.
(Continued)

FOREIGN PATENT DOCUMENTS

| EP | 2 264 966 A1 | 12/2010 | |
| EP | 2264966 A1 * | 12/2010 | ........... H04L 5/0023 |
| EP | 2 557 867 A1 | 2/2013 | |

Primary Examiner — Kwang B Yao
Assistant Examiner — Hardikkumar D Patel
(74) Attorney, Agent, or Firm — Jefferson IP Law, LLP (57) ABSTRACT

The present invention relates to a method and device for controlling a timing of a terminal in a wireless communication system. The method for controlling a timing of a terminal by a base station in a wireless communication system may comprise the steps of: determining a target timing of a terminal so as to locate an uplink signal reception timing of the terminal in a cyclic prefix (CP) interval; transmitting, to the terminal, a timing control command including information on the target timing; receiving an uplink signal from the terminal; and compensating for a time offset value of the received uplink signal on the basis of the target timing.

20 Claims, 6 Drawing Sheets (51) Int. Cl.
*H04L 27/26* (2006.01)
*H04L 5/00* (2006.01)

(58) Field of Classification Search
CPC ...... H04W 88/04; H04L 5/0078; G06F 17/14; G10L 19/02; G10L 17/147; G10L 19/0212
See application file for complete search history.

(56) References Cited

U.S. PATENT DOCUMENTS

| | | |
|---|---|---|
| 2011/0249665 A1 | 10/2011 | Seyama et al. |
| 2011/0292917 A1* | 12/2011 | Fan ................. H04L 5/0023 370/336 |
| 2012/0182874 A1 | 7/2012 | Siomina et al. |
| 2013/0064165 A1* | 3/2013 | Chen ................ H04W 56/0045 370/312 |
| 2013/0223242 A1 | 8/2013 | Chan et al. |
| 2014/0161111 A1* | 6/2014 | Kim ................. H04W 56/0005 370/336 |

* cited by examiner

METHOD FOR CONTROLLING TIMING OF TERMINAL IN WIRELESS COMMUNICATION SYSTEM, AND ELECTRONIC DEVICE THEREFOR

TECHNICAL FIELD

The present invention relates to a wireless communication system and, more particularly, to a method and apparatus for controlling a timing of a user equipment (UE) in a wireless communication system.

BACKGROUND ART

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In a general communication system, a base station may synchronize time between the base station and a UE using two methods. First, during a call setup, the base station estimates a time offset value of the user equipment (UE) by using a Physical Random Access Channel (PRACH) and then transmits a big Time Alignment (TA) control command to a UE so as to adjust a timing of the UE, thereby allowing time synchronization between the base station and the UE. Second, the base station measures a time offset value of the UE by using a Sounding Reference Signal (SRS) or an RS of a Physical Uplink Shared Channel (PUSCH) and then periodically transmits a small TA control command to the UE to adjust a timing of the UE, thereby allowing time synchronization between the base station and the UE.

The base station may adjust the timing of the UE to a time point desired by the base station using the two methods described above. In general, a time offset value is a cause of lowering the link performance. When the time offset value is zero, performance degradation does not occur due to the time offset value. Therefore, it is important to control the timing of the UE such that the time offset value of the UE is to be zero.

However, even when the timing is periodically adjusted, a timing mismatch between UEs may occur because of the movement of the UE or other different reasons. In a state where the timing of the UE is adjusted to zero, and when the timing between the UEs is mismatched due to specific reasons of the UE, an Inter Symbol Interference (ISI) may occur due to a Timing Advance (TA) indicating that a signal transmitted by the UE arrives earlier than the reference timing.

Accordingly, the present invention is to provide a method capable of reducing an ISI occurring due to an offset value between the reference timing and a timing at which a signal transmitted by the UE is received.

DETAILED DESCRIPTION OF THE INVENTION

Technical Problem

Therefore, an embodiment of the present invention is to provide a method and apparatus for compensating for, by a base station, a time offset value of a user equipment (UE).

Another embodiment of the present invention is to provide a method and apparatus for compensating for, by a base station a time offset value of a UE occurred by the target timing set in a Cyclic Prefix (CP) interval.

Still another embodiment of the present invention is to provide a method and apparatus for compensating for, by a base station, a time offset value of a UE on a frequency domain when the time offset value by the target timing of the UE occurs.

Still yet another embodiment of the present invention is to provide a method and apparatus for compensating for, by a base station, a time offset value of a UE on a time domain when the time offset value by the target timing of the UE occurs.

Still yet another embodiment of the present invention is to provide a method and apparatus for collectively compensating for, by a base station, time offset values using target timing information.

Still yet another embodiment of the present invention is to provide a method and apparatus for compensating for, by a base station, a time offset value for each channel using target timing information.

Technical Solution

According to an embodiment of the present invention, there is provided a method for controlling a timing of a user equipment (UE) by a base station in a wireless communication system, the method including: determining a target timing of a UE so as to locate an uplink signal reception timing of the UE in a Cyclic Prefix (CP) interval; transmitting, to the UE, a timing control command including information on the target timing; receiving an uplink signal from the UE; and compensating for a time offset value of the received uplink signal on the basis of the target timing.

According to an embodiment of the present invention, there is provided a base station apparatus for controlling a timing of a UE in a wireless communication system, the apparatus including: a TA controller configured to determine a target timing so as to locate an uplink signal reception timing of the UE in a Cyclic Prefix (CP) interval; and a communication unit configured to transmit, to the UE, a timing control command including information on the target timing, receive an uplink signal from the UE, and then compensate for a time offset value of the received uplink signal on the basis of the target timing.

Advantageous Effects

A base station in a wireless communication system according to the present invention may determine a target timing of a user equipment (UE) so as to locate an uplink signal reception timing of the UE in the Cyclic Prefix (CP) interval and transmits, to the UE, a timing control command including information on the target timing, and then when an uplink signal is received from the UE, may compensate for a time offset value of the uplink reception signal on the basis of the target timing. Therefore, when the uplink signal of the UE is received earlier or later than the target timing due to various reasons such as the movement of the UE or the change of the channel state, or the like, the performance degradation can be prevented. In addition, the base station may compensate, in advance, for a common time offset by a target timing to reduce the amount of mutual interference so as to easily estimate an additional time offset occurring due to the movement of the UE or channel state change, or the like.

MODE FOR CARRYING OUT THE INVENTION

Hereinafter, preferred embodiments of the present invention will be described with reference to the accompanying drawings. Further, in the following description of the present invention, a detailed description of known functions or configurations incorporated herein will be omitted when it may make the subject matter of the present invention rather unclear. The terms which will be described below are terms defined in consideration of the functions in the present invention, and may be different according to users, intentions of the users, or customs. Therefore, the definition should be made based on the contents throughout the specification.

As used in various embodiments of the present invention, the expressions "have", "may have" "include" or "may include", and other conjugates refer to the existence of a corresponding disclosed function, operation, or constituent element, and do not limit one or more additional functions, operations, or constituent elements. Further, as used in various embodiments of the present invention, the terms "include", "have", and their conjugates are intended merely to denote a certain feature, numeral, step, operation, element, component, or a combination thereof, and should not be construed to initially exclude the existence of or a possibility of addition of one or more other features, numerals, steps, operations, elements, components, or combinations thereof.

In various embodiments of the present invention, the expression "A or B" or "at least one of A or/and B" includes any or all of combinations of words listed together. For example, the expression "A or B" or "at least A or/and B" may include A, may include B, or may include both A and B.

While expressions including ordinal numbers, such as "first" and "second", as used in various embodiments of the present invention may modify various constituent elements, such constituent elements are not limited by the above expressions. For example, the above expressions do not limit the sequence and/or importance of the elements. The above-described expressions may be used to distinguish an element from another element. For example, a first user device and a second user device indicate different user devices although both of them are user devices. For example, a first element may be termed a second element, and likewise a second element may also be termed a first element without departing from the scope of various embodiments of the present invention.

It should be noted that if it is described that an element is "coupled" or "connected" to another element, the first element may be directly coupled or connected to the second element, and a third element may be "coupled" or "connected" between the first and second elements. Contrarily, when an element is "directly coupled" or "directly connected" to another element, it may be construed that a third element does not exist between the first element and the second element.

The expression "configured to" used in the present invention may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms as used in various embodiments of the present invention are merely for the purpose of describing particular embodiments and are not intended to limit the present invention to the various embodiments. As used herein, the singular forms are intended to include the plural forms as well, unless the context clearly indicates otherwise.

Unless defined otherwise, all terms used herein, including technical terms and scientific terms, have the same meaning as commonly understood by a person of ordinary skill in the art to which various embodiments of the present invention pertain. Such terms as those defined in a generally used dictionary are to be interpreted to have the meanings equal to the contextual meanings in the relevant field of art, and are not to be interpreted to have ideal or excessively formal meanings unless clearly defined in the present invention.

Hereinafter, in order to solve the problem of performance degradation due to a time offset value, a method for compensating for the time offset value will be described.

Figure 1A:
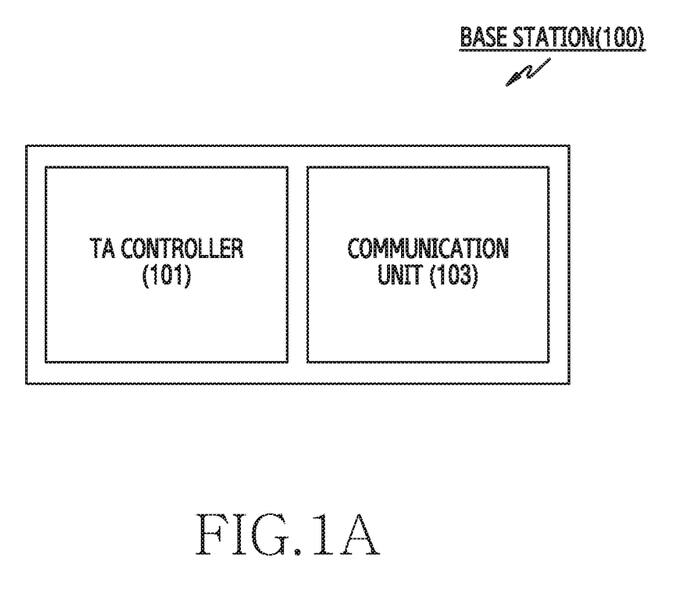
FIG. 1A shows a block diagram of a base station for compensating for a target offset value of a user equipment (UE) in a communication system according to an embodiment of the present invention.

FIG. 1A shows a block diagram of a base station for compensating for a target offset value of a user equipment (UE) in a communication system according to an embodiment of the present invention.

Referring to FIG. 1A, the base station 100 includes a TA controller 101 and a communication unit 105.

The TA controller 101 may control a Time Alignment (TA) function for adjusting the timing of the UE. The TA controller 101 may set a target timing of the UE in order to match the timing of the base station 100 and the timing of the UE. Here, the target timing means uplink signal reception timing from a UE desired by the base station 100. During a call setup, the TA controller 101 may estimate the timing offset of the UE for the target timing using a Physical Random Access Channel (PRACH). The TA controller 101 may transmit a Time Alignment (TA) control command including information on the estimated timing offset to the UE so as to induce the UE to adjust the uplink signal transmission timing. This is to ensure that the uplink signal of the UE is to be received at a target timing desired by the base station 100. For example, the TA controller 101 may set the timing of the UE to a first timing, and during the call setup, estimate the timing offset of the UE for the first timing by using the PRACH channel. The TA controller 101 may transmit a TA control command including the estimated timing offset information to the UE and enables the uplink signal transmitted by the corresponding UE to be received by the base station 100 at the first timing.

According to an embodiment of the present invention, the TA controller 101 may set the target timing of the UE to fall within the interval of the Cyclic Prefix (CP) located at the beginning of a symbol within a sub-frame. For example, the TA controller 101 may set a target timing of the UE not to an uplink reception start time point of the base station 100 but to the time point of one-third in the CP interval in the symbol of the corresponding sub-frame. In an embodiment of the present invention, even when the uplink signal of the UE arrives earlier or later to some extent (for example, one-third of the CP interval), the inter-symbol interference does not occur, so that the setting of the time point of one-third in the CP interval as the target timing is to relatively reduce the probability of an inter-symbol interference. However, since the setting of the target timing as the time point of one-third in the CP interval corresponds to one of the embodiments, it is needless to say that the target timing may be set to a different time point in the CP interval according to various embodiments of the present invention.

When the uplink reception time point of the UE is different from the target timing due to various reasons, such as the movement of the UE or the channel change after adjusting the uplink reception time point of the UE to the target timing through the transmission of the TA control command, that is, when a timing error between the uplink reception time point of the UE and the target timing occurs, the TA controller 101 may periodically transmit a small TA control command to the UE and control a function for more precisely adjusting the timing for the uplink signal of the UE. In this case, the timing at which an uplink signal transmitted by the UE is received by the base station 100 may be obtained by summing the target timing and an error value, as shown in equation (1) as follows:

$$TO(TimeOffset) = Target\_Timing + Delta\_T \quad (1)$$

Here, (TO)TimeOffset refers to a timing at which the uplink signal transmitted by the UE is received by the base station 100, Target_Timing refers to a target timing of the UE set by the base station 100, and Delta_T is a time offset value between a target timing and the uplink signal reception timing of the UE and refers to a time offset value additionally occurring due to various reasons, such as the movement of the UE or channel state change in addition to the value of the time offset occurring due to the target timing. In addition, the magnitude of the Delta_T may be proportional to a transmission cycle of the small TA control command. For example, when the transmission cycle of the small TA control command becomes long, the Delta_T may be large, and when the transmission cycle of the small TA control command becomes short, the Delta_T may be small.

Additionally, in accordance with an embodiment of the present invention, the TA controller 101 controls the function for compensating, in advance, for the time offset by the target timing set by the base station 100. This is for preventing performance degradation from occurring since, when signals for a plurality of UEs are multiplexed, a larger time offset causes larger mutual interference. In addition, the control function is performed to prepare for a situation where the time offset cannot be estimated when the signals for the plurality of UEs are multiplexed or the signal quality is poor. That is, according to an embodiment of the present invention, the TA controller 101 may compensate, in advance, for a common time offset by the target timing to reduce the amount of mutual interference, thereby easily estimating the time offset Delta_T additionally occurring due to the movement of the UE or channel state change, or the like. According to an embodiment of the present invention, in order to compensate, in advance, for the time offset by the target timing, the TA controller 101 may provide information on the target timing to the communication unit 103.

The communication unit 103 controls an overall function for performing communication of the base station 100. For example, the communication unit 103 may transmit and receive signals to and from one or more UEs connected to the base station 100.

The communication unit 103 according to an embodiment of the present invention may compensate, in advance, for the time offset value by the target timing of the UE according to the control of the TA controller 101. That is, when a signal is received, the communication unit 103 may compensate, in advance, for the time offset value by the target timing, and then estimate a time offset, that is Delta_T, which is additionally occurring due to the movement of the UE or the channel state change, and compensate for the estimated Delta_T. A method for compensating for the time offset value of a UE by a communication unit 103 will be described in detail with reference to FIG. 1B and FIG. 1C.

Figure 1B:
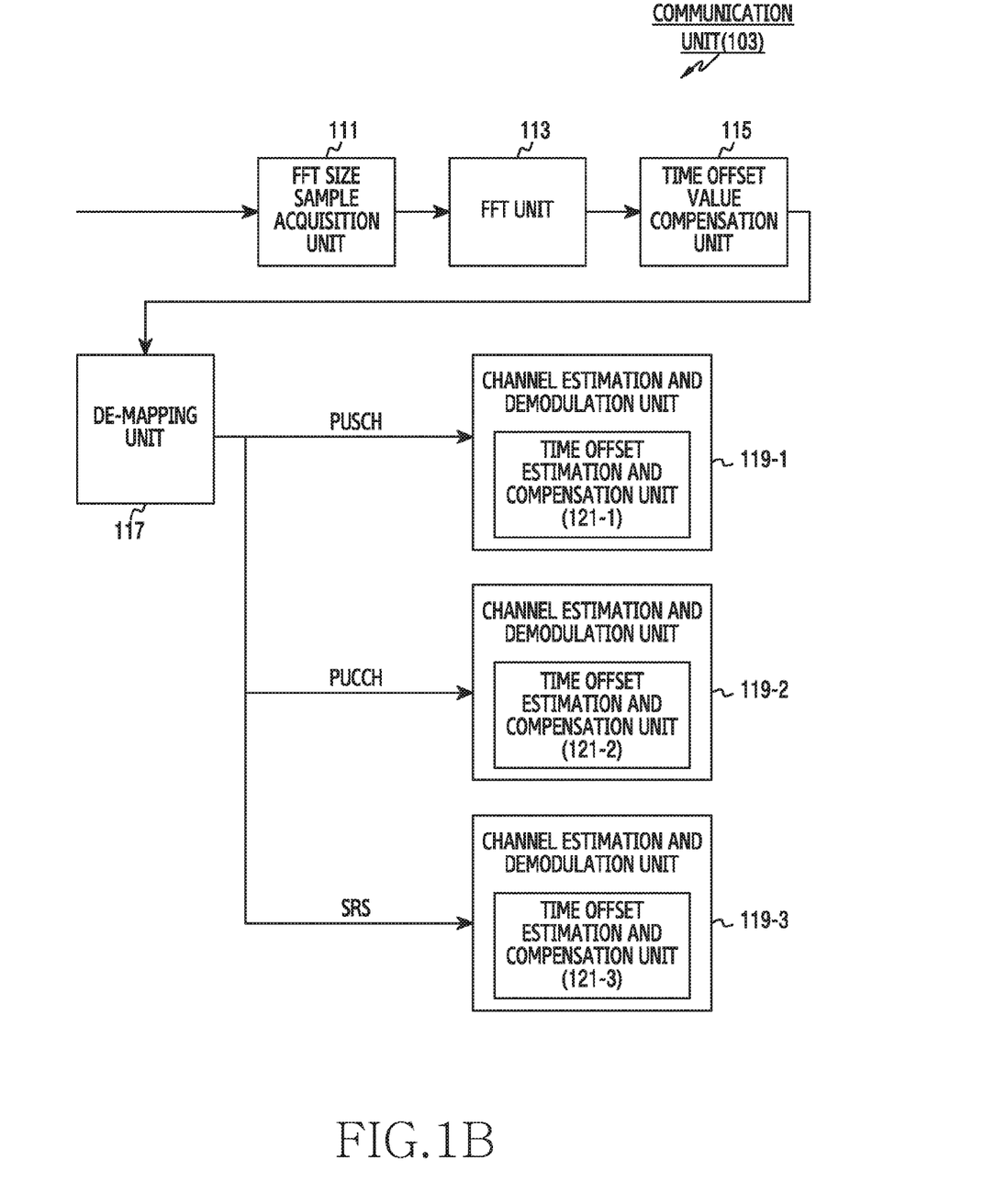
FIG. 1B is a detailed block diagram of a communication unit for collectively compensating for time offset values in a fast Fourier transform (FFT) output end of a base station according to an embodiment of the present invention.

FIG. 1B is a detailed block diagram of a communication unit 103 for collectively compensating for time offset values in a fast Fourier transform (FFT) output end of a base station according to an embodiment of the present invention.

In FIG. 1B, an example will be described for collectively compensating for the offset values of the UEs by placing a time offset adjustment block for adjusting the time offset value of the UE in a Fast Fourier Transform (FFT) output end.

Referring to FIG. 1B, the communication unit 103 may include an FFT size sample acquisition unit 111, an FFT unit 113, a time offset value compensation unit 115, a de-mapping unit 117, and a plurality of channel estimation and demodulation units 119-1 to 119-3.

The communication unit 103 may acquire samples of the size of the FFT through the FFT size sample acquisition unit 111 and then perform an FFT operation on the samples of the size of the FFT so as to recovery signals in a frequency domain.

According to an embodiment of the present invention, the communication unit 103 may compensate for a time offset value by the target timing, which is the time offset value common in output signals from the FFT unit 113, through a time offset value compensation unit 115 located at the output end of the FFT unit 113. For example, the time offset value compensation unit 115 may calculate the phase shift corresponding to the target timing to compensate the phase of the FFT output signal, thereby collectively compensating for the time offset value by the target timing, which is the common time offset value. In this case, the time offset value by the target timing can be compensated for by equation (2) as follows:

$$\text{ToComp\_Out}(k) = \text{fft\_out}(k) * \exp\left(-\frac{j2\Pi k \cdot \text{Target\_Timing}}{N_{\textit{fft}}}\right) \quad (2)$$

Here, $N_{\textit{fft}}$ refers to a size of an FFT, Target_Timing refers to a target timing of the UE desired by a base station 100, fft_out(k) refers to an output value of the FFT, and k refers to a tone index. In addition, ToComp_Out(k) refers to an output signal in which the time offset value by the target timing is compensated for, for example, a phase compensated signal.

As described above, the time offset by the target timing is compensated for at the output end of the FFT unit 113 so that a time offset that commonly exists in a Physical Uplink Shared Channel (PUSCH), a Physical Uplink Control Channel (PUCCH), and a Sounding Reference Signal (SRS) may be collectively compensated. According to another embodiment, the communication unit 103 may compensate for, on a time domain, the time offset value by the target timing of the UE.

The communication unit 103 may classify the time offset compensated signals into a signal for each channel through the de-mapping unit 117 and provide the corresponding channel signal to each of the channel estimation and demodulation units 119-1 to 119-3. For example, the de-mapping unit 117 classifies a Physical Uplink Shared Channel (PUSCH), a Physical Uplink Control Channel (PUCCH), and a Sounding Reference Signal (SRS) and provides the classified signals to the channel estimation and demodulation units 119-1 to 119-3 corresponding to the corresponding channel. The communication unit 103 performs channel estimation and demodulation on the received signals through each of the channel estimation and demodulation units 119-1 to 119-3. Each of the channel estimation and demodulation units 119-1 to 119-3 may include time offset estimation and compensation units 121-1 to 121-3, and estimate a time offset which can occur during a small TA channel control period through a predetermined channel estimation algorithm, that is, Delta_T, which is a time offset additionally occurring due to the movement of the UE or the channel state change, or the like, and compensate for the estimated Delta_T. As described above, when the Delta_T is estimated after compensating, in advance, for the time offset value by the target timing, the amount of interference between UEs is lowered, so that the Delta_T can be more easily estimated.

Figure 1C:
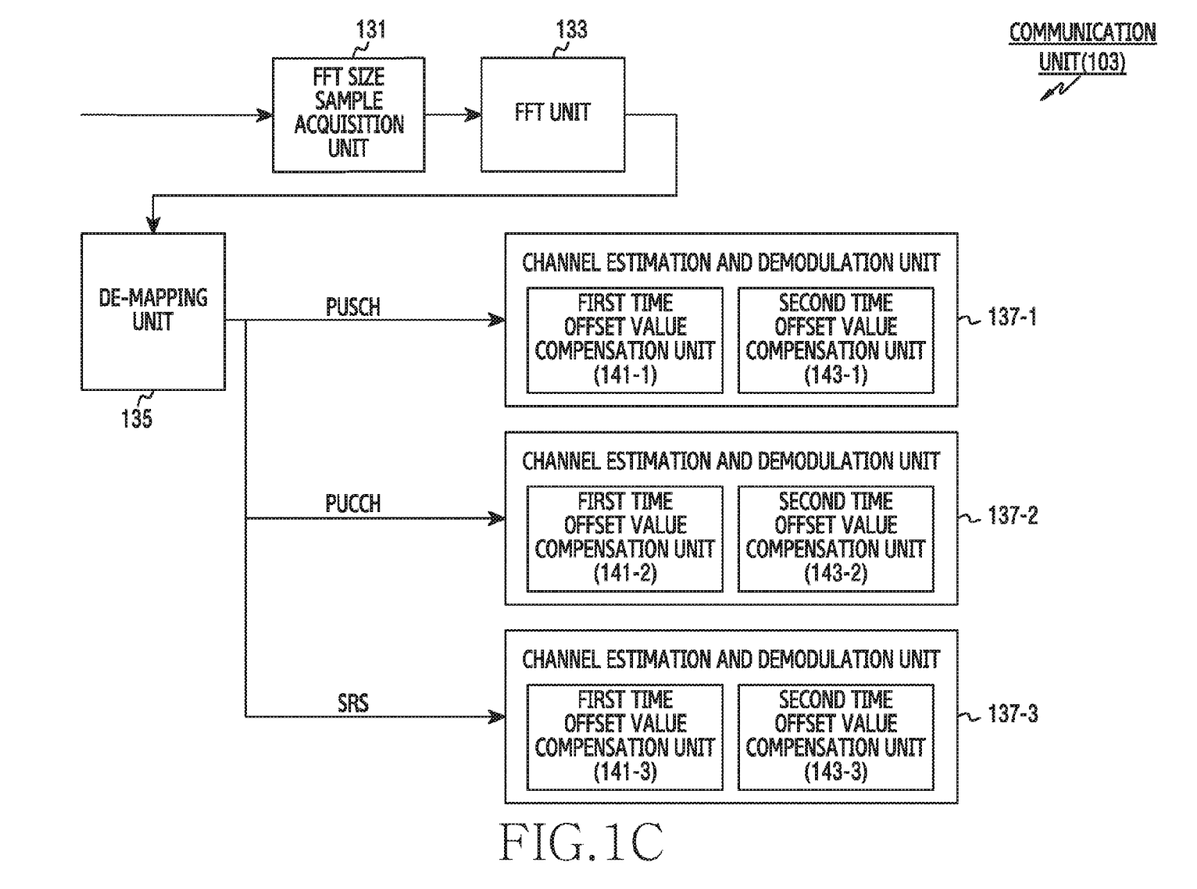
FIG. 1C is a detailed block diagram of a communication unit for compensating for a time offset value for each channel of a base station according to another embodiment of the present invention.

FIG. 1C is a detailed block diagram of a communication unit 103 for compensating for a time offset value for each channel of a base station according to another embodiment of the present invention.

FIG. 1C describes an example of compensating for the offset value of the UE for each channel by disposing a time offset adjustment block which adjusts the time offset value of the UE within a block for performing channel estimation and demodulation for each channel.

Referring to FIG. 1C, the communication unit 103 may include an FFT size sample acquisition unit 131, an FFT unit 133, a de-mapping unit 135, and a plurality of channel estimation and demodulation units 137-1 to 137-3, and each of the plurality of channel estimation and a demodulation units 137-1 to 137-3 may include the first time offset value compensation units 141-1 to 141-3 and the second time offset value compensation units 143-1 to 143-3.

The communication unit 103 may acquire samples of the size of the FFT through the FFT size sample acquisition unit 131 and then perform an FFT operation on the samples of the size of the FFT through the FFT unit 133 so as to recover signals in the frequency domain.

The communication unit 103 may divide the signals in the frequency domain output from the FFT unit 133 into a signal for each channel through the de-mapping unit 135 and provide the corresponding channel signal to each of the channel estimation and demodulation units 137-1 to 137-3. For example, the de-mapping unit 135 classifies a Physical Uplink Shared Channel (PUSCH), a Physical Uplink Control Channel (PUCCH), and a Sounding Reference Signal (SRS) and provides the classified signals to the channel estimation and demodulation units 137-1 to 137-3 corresponding to the corresponding channel.

The communication unit 103 performs channel estimation and demodulation on the signal received through each of the channel estimation and demodulation units 137-1 to 137-3. In this case, each of the channel estimation and demodulation units 137-1 to 137-3 may compensate, in advance, for the time offset value by the target timing, which is the common time offset value, by including the first time offset value compensation units 141-1 to 141-3 and the second time offset value compensation units 143-1 to 143-3, and may compensate for Delta_T, which is the additionally occurring time offset due to the movement of the UE or the channel state change. For example, each of the first time offset value compensation units 141-1 to 141-3 may compensate for the time offset value by the target timing by compensating the phase of the received signal on the basis of the equation (2) described above. In addition, each of the second time offset value compensation units 143-1 to 143-3 may estimate a time offset which can occur during a small TA control period through a predetermined channel estimation algorithm, that is, Delta_T, additionally occurring due to the movement of the UE or the channel state change, and compensate for the estimated Delta_T. As described above, when the Delta_T is estimated after compensating, in advance, for the time offset value by the target timing, the amount of interference between UEs is lowered, so that the Delta_T can be more easily estimated.

Figure 2A:
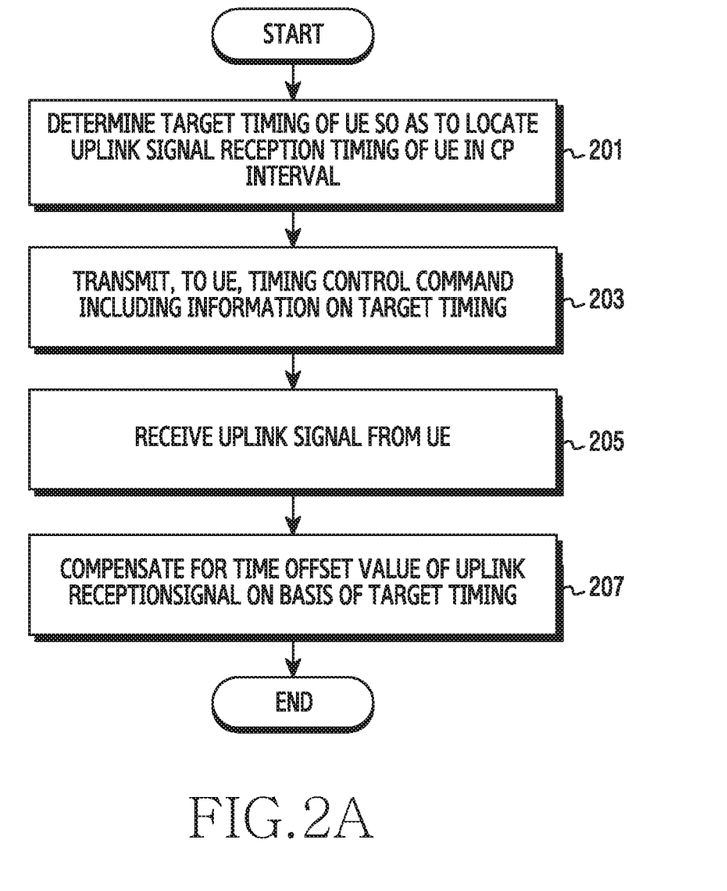
FIG. 2A is a diagram illustrating a procedure for compensating for a target offset value based on a target timing of a UE by a base station according to an embodiment of the present invention.

FIG. 2A is a diagram illustrating a procedure for compensating for a target offset value based on a target timing of a UE by a base station according to an embodiment of the present invention.

Referring to FIG. 2A, the base station 100 may determine a target timing of the UE so as to locate the uplink signal reception timing of the UE in a CP interval, in step 201. For example, the base station 100 may determine the target timing of the UE such that the uplink signal of the UE is received at the time point of one-third in the CP interval.

Then, the base station 100 may transmit a timing control command including information on the target timing to the UE, in step 203. For example, in order to receive the uplink signal of the UE at a target timing desired by the base station, the base station 100 may estimate a timing offset of the UE for the target timing using a PRACH channel during the call setup of the UE, and transmit a TA control command including the estimated timing offset information to the UE.

Thereafter, the base station 100 may receive an uplink signal from the UE, in step 205. For example, the base station 100 may receive an uplink signal from a UE where an uplink transmission and reception time point is adjusted by the target timing set by the base station. At this time, the uplink signal of the UE may be received at the target timing set by the base station, and the uplink signal of the UE may be received earlier or later than the target timing due to various reasons such as the movement of the UE or channel state change, and the like. That is, the uplink signal of the UE may include an additional time offset value for the target timing due to various reasons.

Then, the base station 100 may compensate for the time offset value of the uplink reception signal based on the target timing, in step 207. For example, as shown in equation (2), the base station 100 may compensate for the value of the time offset occurring due to the target timing set by the base station. At this time, the base station 100 may compensate for the time offset value by the target timing at the output end of the FFT unit 113 so as to collectively compensate for timing offsets for all channels. In addition, the base station 100 may compensate for the time offset value by the target timing in the block for performing channel estimation and demodulation for each channel so as to compensate for the timing offset for each channel. According to another embodiment, the base station 100 may compensate for the time offset by the target timing in the time domain.

Then, the UE 100 terminates the procedure according to an embodiment of the present invention.

Figure 2B:
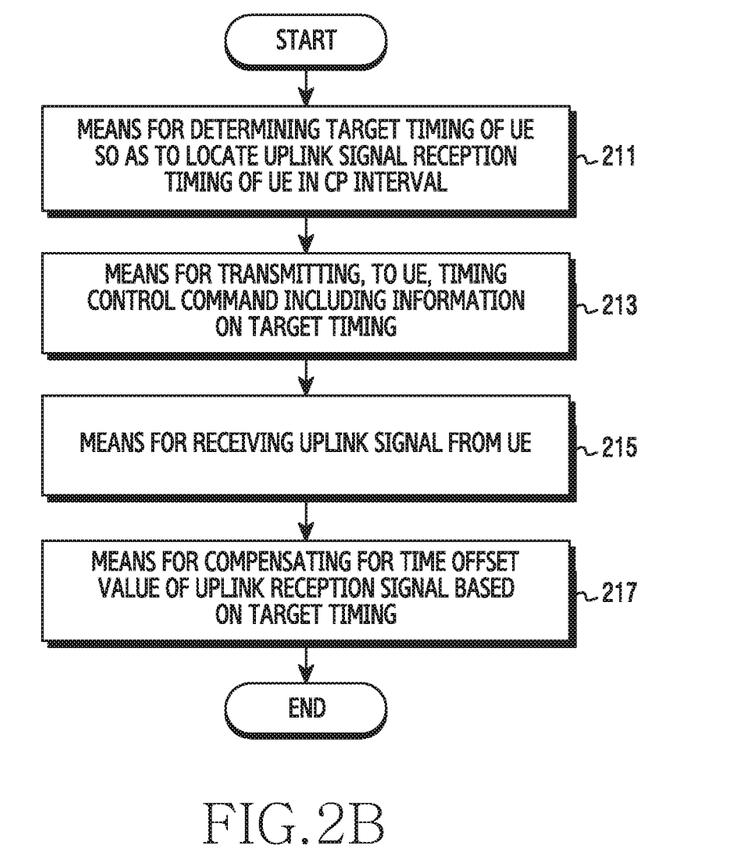
FIG. 2B is a diagram illustrating a means for compensating for a target offset value based on a target timing of a UE by a base station according to an embodiment of the present invention.

FIG. 2B is a diagram illustrating a means for compensating for a target offset value based on a target timing of a UE by a base station according to an embodiment of the present invention.

Referring to FIG. 2B, the base station 100 may include a means 211 for determining a target timing of the UE so as to locate the uplink signal reception timing of the UE in a CP interval.

In addition, the base station 100 may include a means 213 for transmitting, to the UE, a timing control command including information on the target timing. The base station 100 may include a means for estimating the timing offset of the UE for the target timing, by using the PRACH channel during the call setup of the UE, and a means for transmitting a TA control command including the estimated timing offset information to the UE.

The base station 100 may include a means 215 for receiving an uplink signal from the UE. At this time, the base station 100 may include a means for checking the time offset value from the uplink signal received from the UE.

In addition, the base station 100 may include a means 217 for compensating for the time offset value of the uplink reception signal based on the target timing. At this time, the base station 100 may include a means for collectively compensating for the timing offset value by the target timing for all channels, and a means for compensating for the timing offset for each channel. In addition, the base station 100 may include a means for compensating for the time offset by the target timing in the time domain.

Figure 3:
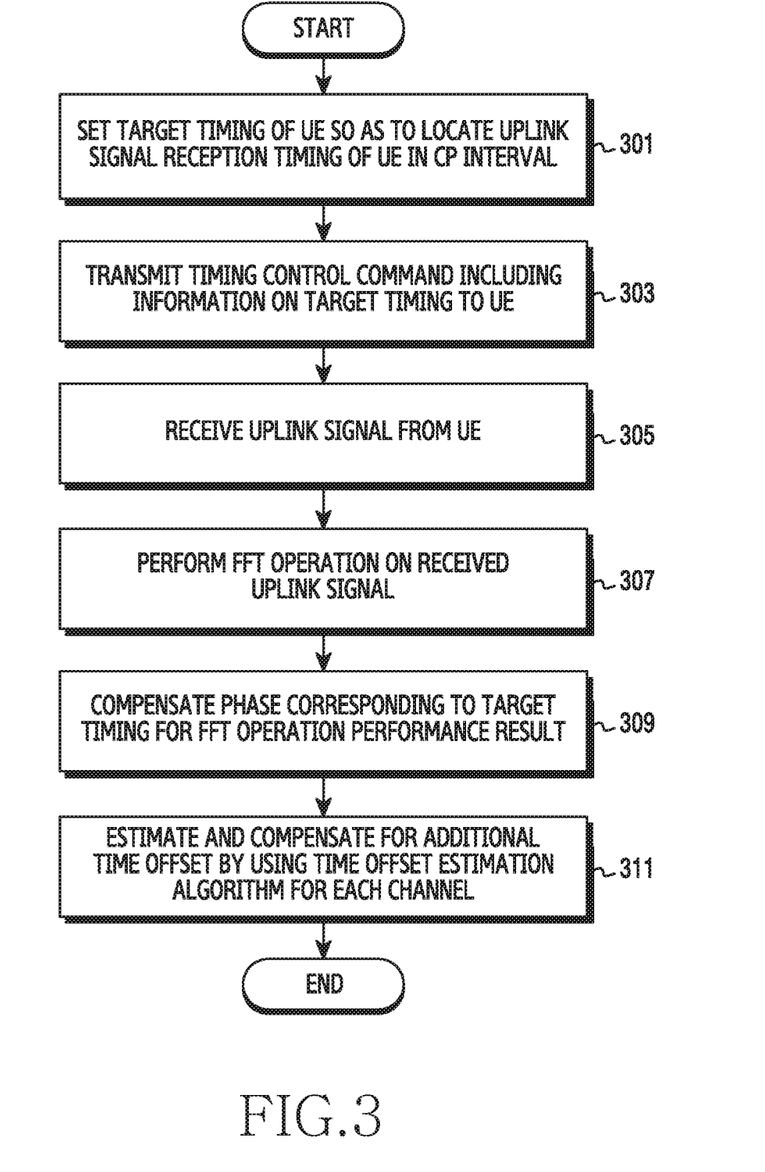
FIG. 3 is a diagram illustrating a procedure for compensating for a target offset value of a UE by a base station according to an embodiment of the present invention.

FIG. 3 is a diagram illustrating a procedure for compensating for a target offset value of a UE by a base station according to an embodiment of the present invention.

Referring to FIG. 3, the base station 100 may determine a target timing of the UE so as to locate the uplink signal reception timing of the UE in a CP interval, in step 301. For example, the base station 100 may determine the target timing of the UE such that the uplink signal of the UE is received at the time point of one-third in the CP interval. For another example, the base station 100 may determine the target timing of the UE such that the uplink signal of the UE is received at the time point of one-half in the CP interval.

Then, the base station 100 may transmit a timing control command including information on the target timing to the UE, in step 303. For example, in order to receive the uplink signal of the UE at a target timing desired by the base station, the base station 100 may estimate a timing offset of the UE for the target timing by using a PRACH channel during the call setup of the UE, and transmit a TA control command including the estimated timing offset information to the UE.

Thereafter, the base station 100 may receive an uplink signal from the UE, in step 305. For example, the base station 100 may receive an uplink signal from a UE where an uplink transmission and reception time point is adjusted by the target timing set by the base station. At this time, the uplink signal of the UE may be received at the target timing set by the base station, and the uplink signal of the UE may be received earlier or later than the target timing due to various reasons such as the movement of the UE or channel state change, or the like. That is, the uplink signal of the UE may include an additional time offset value for the target timing due to various reasons.

Then, the base station 100 may perform an FFT operation on the uplink signal received at step 307, and the procedure proceeds to step 309 where the base station 100 may compensate a phase corresponding to the target timing with respect to the FFT operation performance result. For example, the base station 100 may recognize that the uplink signal reception timing of the UE includes a timing offset equal to the target timing set by the base station, and compensate for the time offset value by the target timing, based on the target timing information set by the base station as shown in the above-described equation (2). At this time, the base station 100 may collectively compensate for the time offset value by the target timing or individually compensate for each channel. For example, the base station 100 may collectively compensate for the time offset value by the target timing at the FFT output end, and a plurality of channel estimation and demodulation blocks for processing each channel signal after the FFT operation may compensate for the time offset value by the target timing.

Then, the procedure proceeds to step 311 where the base station 100 may estimate an additional time offset value by using a time offset estimation algorithm for each channel, and compensate for an estimated additional time offset value. For example, the plurality of channel estimation and demodulation blocks of the base station 100 may estimate an additional time offset value occurring due to various reasons, such as movement of the UE or the channel state change by using the channel estimation algorithm, and compensate for the estimated additional time offset value.

According to an embodiment of the present invention, as shown in step 309 and step 311, the base station may compensate, in advance, for the time offset value by the target timing to reduce the amount of interference between signals and more easily estimate a time offset value generated due to the movement of the UE or other reasons other than the time offset value by the target timing.

Thereafter, the UE 100 terminates the procedure according to an embodiment of the present invention.

In FIG. 3 described above, a method has been described for compensating for the time offset by the target timing in the frequency domain after performing the FFT operation on the received signal, and according to another embodiment, the time offset by the above-described target timing may be compensated for in the time domain.

According to an embodiment of the present invention, a method for controlling a timing of a UE by a base station in a wireless communication system comprises: determining a target timing of a UE so as to locate an uplink signal reception timing of the UE in a Cyclic Prefix (CP) interval; transmitting, to the UE, a timing control command including information on the target timing; receiving an uplink signal from the UE; and compensating for a time offset value of the received uplink signal on the basis of the target timing.

In an embodiment of the present invention, the compensation of the time offset value of the received uplink signal based on the target timing may include: performing an FFT operation on the received uplink signal to convert the uplink signal into a signal in a frequency domain; and compensating for a phase corresponding to the target timing with respect to the signal in the frequency domain.

In an embodiment of the present invention, the phase corresponding to the target timing may be compensated by using the equation (2).

In an embodiment of the present invention, the compensation of the time offset value of the received uplink signal on the basis of the target timing may include: compensating for a time corresponding to the target timing with respect to an uplink signal in a time domain.

In an embodiment of the present invention, the compensation of the time offset value of the received uplink signal on the basis of the target timing may include: collectively compensating for the time offset value by the target timing prior to classifying the received uplink signal into a plurality of channel signals.

In an embodiment of the present invention, the compensation of the time offset value of the received uplink signal on the basis of the target timing may include: classifying the received uplink signal into a plurality of channel signals; and compensating for the time offset value by the target timing in each of the plurality of channels.

In an embodiment of the present invention, the method may further include: after compensating for the time offset value of the received uplink signal, estimating an additional time offset using a channel estimation algorithm in each of the plurality of channels for the received uplink signal, and compensating for the estimated additional time offset.

In an embodiment of the present invention, the additional time offset may be a time offset additionally occurring due to at least one of the movement of the UE and the channel state change.

In an embodiment of the present invention, the transmitting of the timing control command including information on the target timing to the UE may include: estimating a timing offset of the UE for the target timing by using a particular channel during a call setup of the UE; and transmitting, to the UE, a Time Alignment (TA) control command including the estimated timing offset information.

According to an embodiment of the present invention, a base station apparatus for controlling a timing of a UE in a wireless communication system may include: a TA controller configured to determine a target timing of the UE so as to locate an uplink signal reception timing of the UE in a Cyclic Prefix (CP) interval; and a communication unit configured to transmit, to the UE, a timing control command including information on the target timing, receive an uplink signal from the UE, and then compensate for a time offset value of the received uplink signal on the basis of the target timing.

In an embodiment of the present invention, the communication unit may perform an FFT operation on the received uplink signal to convert the uplink signal into a signal in a frequency domain, and then compensate for the phase corresponding to the target timing with respect to the signal in the frequency domain.

In an embodiment of the present invention, the phase corresponding to the target timing may be compensated by using equation (2).

In an embodiment of the present invention, the communication unit may compensate for a time corresponding to the target timing with respect to an uplink signal in a time domain.

In an embodiment of the present invention, the communication unit may collectively compensate for the time offset value by the target timing prior to classifying the received uplink signal into a plurality of channel signals.

In an embodiment of the present invention, the communication unit may classify the received uplink signal into a plurality of channel signals and then compensate for the time offset value by the target timing in each of the plurality of channels.

In an embodiment of the present invention, the communication unit may compensate for the time offset value of the received uplink signal and then estimate an additional time offset by using a channel estimation algorithm in each of the plurality of channels for the received uplink signal, and compensate for the estimated additional time offset.

In an embodiment of the present invention, the additional time offset may be a time offset additionally occurring due to at least one of the movement of the UE and the channel state change.

In an embodiment of the present invention, the communication unit may estimate the timing offset of a UE for the target timing by using a particular channel during the call setup of the UE, and then transmit a Time Alignment (TA) control command including the estimated timing offset information to the UE. Although specific embodiments and drawings of the present invention have been described for illustrative purposes, the present invention is not limited thereto, and those skilled in the art will appreciate that various modifications, additions, and substitutions are possible, without departing from the descriptions.

Methods stated in claims and/or specifications according to various embodiments may be implemented by hardware, software, or a combination of hardware and software.

When implemented in software, it may be provided with a computer-readable storage medium storing one or more programs (software modules). The one or more programs stored in the computer-readable storage medium may be configured for execution by one or more processors within the electronic device. The at least one program may include commands that cause the electronic device to perform the methods according to various embodiments of the present invention as defined by the appended claims and/or disclosed herein.

The computer readable medium may include a program command, a data file, a data structure, and the like independently or in combination. The program command may be things specially designed and configured for the present invention, or things that are well known to and can be used by those skilled in the related art. Examples of the computer readable recoding medium include magnetic media such as a hard disk, a floppy disk, and a magnetic tape, optical media such as a CD-ROM and a DVD, magneto-optical media such as a floptical disk, and hardware devices such as a ROM, RAM, and a flash memory, which are specially constructed in such a manner that they can store and execute a program command. Examples of the program command include a machine language code generated by a compiler and a high-level language code executable by a computer through an interpreter and the like. When all or some of the base stations or relays as described in the present invention are implemented by a computer program, a computer-readable recording medium in which the computer program is stored also falls within the present invention. Therefore, the scope of the present invention should not be defined as being limited to the embodiments, but should be defined by the appended claims and equivalents thereof.

The invention claimed is:

1. A method for operating a base station in a wireless communication system comprising:
    determining a target timing to locate a reception timing of an uplink signal transmitted from a terminal in a cyclic prefix (CP) interval;
    transmitting, to the terminal, a time alignment (TA) command for adjusting a transmission timing of uplink signal based on the target timing;
    receiving, from the terminal, the uplink signal having a time offset transmitted according the TA command;
    compensating for a first part of the time offset, without estimating the first part of the time offset, by a first value corresponding to the target timing determined by the base station; and
    compensating for a second part of the time offset by a second value estimated by using the received uplink signal.

2. The method of claim 1, wherein the compensating for the first part of the time offset comprises:
    performing a fast Fourier transform (FFT) operation on the received uplink signal to convert the uplink signal into a signal in a frequency domain; and
    compensating a phase corresponding to the value of the target timing in the frequency domain.

3. The method of claim 2,
    wherein the phase corresponding to the value of the target timing is compensated by equation as follows:

$$\text{ToComp\_Out}(k) = \text{fft\_out}(k) * \exp\left(-\frac{j2\Pi k \cdot \text{Target\_Timing}}{N_{\mathit{fft}}}\right)$$

and
    wherein, $N_{\mathit{fft}}$ refers to a size of an FFT, Target_Timing refers to the target timing determined by the base station, fft_out(k) refers to an output value of the FFT, and k refers to a tone index.

4. The method of claim 1, wherein the compensating for the first part of the time offset comprises:
    compensating for a time corresponding to the value of the target timing in a time domain.

5. The method of claim 1, wherein the compensating for the first part of the time offset comprises:
    collectively compensating for the time offset by the first value corresponding to the target timing prior to classifying the received uplink signal into a plurality of channel signals.

6. The method of claim 1, wherein the compensating for the first part of the time offset comprises:
    classifying the received uplink signal into a plurality of channel signals; and
    compensating for the time offset by the first value corresponding to the target timing in each of the plurality of channels.

7. An apparatus of a base station in a wireless communication system, the apparatus comprising:
    a controller configured to determine a target timing to locate a reception timing of an uplink signal transmitted from a terminal in a cyclic prefix (CP) interval; and
    a communication unit configured to:
        transmit, to the terminal, a time alignment (TA) command for adjusting a transmission timing, of the uplink signal based on the target timing;
        receive from the terminal, the uplink signal having a time offset transmitted according to the TA command;
        compensate for a first part of the time offset, without estimating the first part of the time offset, by a first value corresponding to the tare timing determined by the base station; and
        compensate for a second part of the time offset by a second value estimated by using the received uplink signal.

8. The apparatus of claim 7, wherein the communication unit is configured to perform a fast Fourier transform (FFT) operation on the received uplink signal to convert the uplink signal into a signal in a frequency domain, and then compensate a phase corresponding to the target timing in the frequency domain.

9. The apparatus of claim 8,
    wherein the phase corresponding to the target timing is compensated by equation as follows:

$$\text{ToComp\_Out}(k) = \text{fft\_out}(k) * \exp\left(-\frac{j2\Pi k \cdot \text{Target\_Timing}}{N_{\mathit{fft}}}\right),$$

and
    wherein, $N_{\mathit{fft}}$ refers to a size of an FFT, Target_Timing refers to the target timing determined by the base station, fft_out(k) refers to an output value of the FFT, and k refers to a tone index.

10. The apparatus of claim 7, wherein the communication unit is configured to compensate for a time corresponding to the target timing in a time domain.

11. The apparatus of claim 7, wherein the communication unit is configured to collectively compensate for the time offset value by the first value corresponding to the target timing prior to classifying the received uplink signal into a plurality of channel signals.

12. The apparatus of claim 7, wherein the communication unit is configured to classify the received uplink signal into a plurality of channel signals and then compensate for the time offset value by the first value corresponding to the target timing in each of the plurality of channels.

13. The method of claim 1, wherein the second part of the time offset occurs due to at least one of a movement of the terminal and a channel state change.

14. The apparatus of claim 7, wherein the second part of the time offset occurs due to at least one of a movement of the terminal and a channel state change.

15. The method of claim 1, wherein the target timing is determined to locate the reception timing of the uplink signal transmitted from the terminal at a one-third point in the CP interval.

16. The method of claim 1, further comprising:
  estimating a timing offset for the target timing by using a random access channel during a call setup of the terminal, and
  generating the TA command based on the timing offset.

17. The method of claim 1, further comprising:
  estimating the second value by using a time offset algorithm for each channel.

18. The apparatus of claim 7, wherein the target timing is determined to locate the reception timing of the uplink signal transmitted from the terminal at a one-third point in the CP interval.

19. The apparatus of claim 7, wherein the communication unit is further configured to:
  estimate a timing offset for the target timing by using a random access channel during a call setup of the terminal, and
  generate the TA command based on the timing offset.

20. The apparatus of claim 7,
  wherein the communication unit is further configured to estimate the second value by using a time offset algorithm for each channel.

* * * * *